United States Patent [19]

Frey et al.

[11] Patent Number: 4,897,237
[45] Date of Patent: Jan. 30, 1990

[54] METHOD OF FITTING EYEGLASSES

[76] Inventors: Peter Frey, Poststrasse 6, D-4250 Bottrop; Hans-Jürgen Kellner, Dieselstrasse 6, D-4200 Oberhausen, both of Fed. Rep. of Germany

[21] Appl. No.: 624,673
[22] PCT Filed: Nov. 10, 1983
[86] PCT No.: PCT/EP83/00294
§ 371 Date: Jun. 11, 1984
§ 102(e) Date: Jun. 11, 1984
[87] PCT Pub. No.: WO84/02009
PCT Pub. Date: May 24, 1984

[30] Foreign Application Priority Data
Nov. 10, 1982 [DE] Fed. Rep. of Germany ....... 3241455

[51] Int. Cl.$^4$ .............................................. B29C 33/38
[52] U.S. Cl. ............................ 264/222; 264/DIG. 30; 351/130
[58] Field of Search ............... 264/222, 220, 227, 226, 264/DIG. 30; 351/124, 130, 131, 132

[56] References Cited

U.S. PATENT DOCUMENTS

| | | | |
|---|---|---|---|
| 2,949,638 | 8/1960 | Butler | 29/20 |
| 3,027,598 | 4/1962 | Neefe | 249/96 |
| 3,584,939 | 6/1971 | Olsen et al. | 351/130 |
| 3,597,053 | 8/1971 | Mastman | 351/41 |
| 3,701,592 | 10/1972 | Fernandez | 351/130 |
| 4,204,750 | 5/1980 | Hilbert | 264/222 |

FOREIGN PATENT DOCUMENTS

| | | |
|---|---|---|
| 894660 | 1/1983 | Belgium . |
| 3130144 | 2/1983 | Fed. Rep. of Germany . |

Primary Examiner—Jan H. Silbaugh
Assistant Examiner—Mary Lynn Fertig
Attorney, Agent, or Firm—Max Fogiel

[57] ABSTRACT

To adjust eye-glasses to the special shape of the nose of the person wearing the eye-glasses, a faithful molding of the back of the nose is formed. To this effect, once the spectacles are put on, the space remaining between the spectacle arch (4) and the back of the nose is filled with a plastic and hardenable molding material. The spectacle arch (4) is embedded into the hardened molding material to form a plaster model (6). After having removed the molding material, the cavity separating the spectacle arch (4) from the model (6) is filled with a hardenable plastic material which sets on the spectacle. material. Said plastic material forms after hardening on the spectacle arch (4) an additional layer (5) adapted to the back of the nose of the person wearing the spectacles.

2 Claims, 1 Drawing Sheet

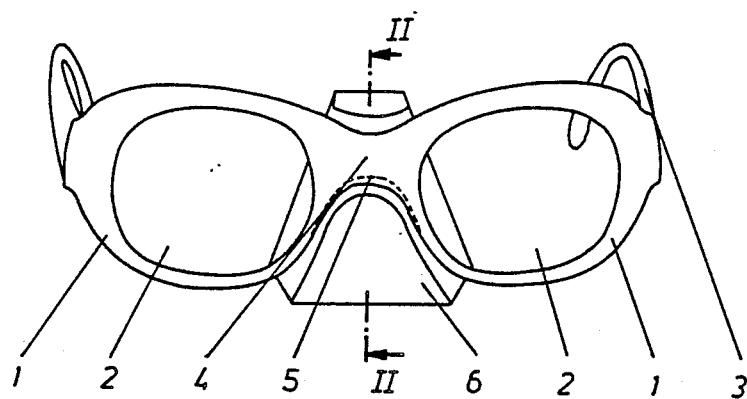
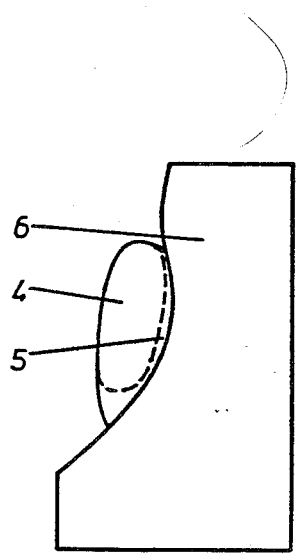
Fig. 2

METHOD OF FITTING EYEGLASSES

The invention concerns eyeglasses and a method of fitting them to the human nose.

Everyone who wears eyeglasses must support almost their total weight with his nose. The only relief is contributed by the backward tension of the temples of the glasses. This relief, however, can amount to no more than 10% depending on how the ends of the temples are individually adjusted to the anatomy behind the ear. The distribution of weight on the nose is accordingly of highest significance. The largest contact surface possible will result in the most beneficial distribution of pressure and hence the lowest level of pressure on the surface being loaded.

Normally a well fitted pair of eyeglasses that is correctly sized and has normal to middle-level correction lenses presents no problem to either the optician or the wearer. Since the optician has eyeglasses in the widest range of materials, shapes, sizes, and designs available, the wearer will be satisfied with how his glasses fit if they have been professionally selected, processed, and adjusted.

Problems do occur however in providing those with faulty vision with eyeglasses, that can not or not adequately be solved with normal glasses. Problems of this nature derive first from weight of the glasses. Strong lenses, especially plus lenses, have a high inherent weight. This is especially true of eyeglasses for those who have had cataract operations because the glasses are relatively heavy due to being in the extremely high plus range. Plastic lenses are not always employed in such cases because of their susceptibility to scratching or lack of phototropic properties. Since contemporary large eyeglass frames accommodate large masses of glass, the weight of the glasses will be correspondingly high in this case as well. Further problems derive from anomalies of the nose and face or from a face that is not atomically suited to the support of eyeglasses. Such cases include flat or excessively sloping nasal bridges, bridges with almost no musculature, noses distorted as the result of accident or operation, noses that have no structure at the top, noses that are thick and too fat at the top, and cheeks that are too rounded in relation to a small nose. Finally, sensitivity of the skin, which is extremely common, must also be taken into consideration.

The object of the present invention is to provide a method of fitting eyeglasses to the particular nose of the wearer that will result in a good fit of the eyeglasses on the wearer's nose even subject to undesirable conditions.

The method in accordance with the invention involves obtaining an impression of the wearer's nose and inserting or mounting the impression in or on the frame of the eyeglasses. The result is a pair of eyeglasses with optimal distribution over the bridge of the nose of the pressure deriving form the weight of the glasses due to the "embedding" of the nasal bridge in the glasses. The bridge of the eyeglasses in accordance with the invention represents a "negative" of the "positive" nose.

One embodiment of the invention is illustrated in the drawing and will now be described in detail.

FIG. 1 is a front view of a pair of eyeglasses in accordance with the invention and FIG. 2 is a section along the line II—II in FIG. 1.

The eyeglasses have a semifinished frame with two eyewires 1 that surround the lenses 2. Temples 3 are attached by hinges to eyewires 1. Eyewires 1 are connected by an eyeglass bridge 4.

An additional layer 5 of plastic that bonds to the material that the frame is made out of is applied to eyeglass bridge 4. Layer 5 appears in the drawing as the surface between the broken line and the outer contour of eyeglass bridge 4 facing the nose. The outer contour matches the shape of the bridge of the wearer's nose. The method of obtaining additional layer 5 by means of a model 6 matching a particular nasal bridge will now be described.

An appropriate amount of a curing plastic impression material is distributed over the bridge of the nose of the person with impaired vision. The eyeglasses are then placed over it in the optimal position. A preferred impression material is a kneaded mass of silicone with a hardener added to it to obtain harness in a few minutes. The eyeglasses remain on the nose until the impression material has set, which demands approximately two to three minutes.

The eyeglasses are taken off and lenses 2 and temples 3 removed from the frame. Eyeglass bridge 4 is embedded along with the hardened impression material in plaster. This results in a precise model 6 of the bridge of the wearer's nose in the vicinity of the eyeglass bridge. The model is trimmed and allowed to harden, the eyeglasses lifted out, and the impression material removed from the eyeglass bridge.

The eyeglasses are attached, with wax for example, to model 6. The hollow space left between eyeglass bridge 4 and model 6 when the hardened impression material is removed is filled with plastic. A preferred plastic is a two-component plastic of the type also employed in dentistry and that can be poured or sprinkled. The eyeglass frame is placed with the plastic on its bridge 4 in a pressurized vessel, in which the plastic is polymerized with hot water at preferably 2.2 to 2.5 bars. A nasal cushion specific to the individual wearer is thus secured to eyeglass bridge 4.

We claim:

1. Method of fitting eyeglasses to a wearer's nose, comprising the steps of: filling a hollow space between eyeglass bridge and bridge of the nose with a curing plastic impression material while the glasses are in place to produce an impression of the bridge of the wearer's nose; allowing the impression material to harden; removing the eyeglasses from the wearer's nose; removing lenses and temples from the eyeglasses; embedding the eyeglass bridge along with the cured impression material in molding material to obtain a model; removing the impression material from the eyeglasses; filling hollow space left between the eyeglass bridge and the model with a curing plastic that bonds to the material of the eyeglass frame; subjecting the eyeglasses together with the molded-on plastic to a heat treatment under elevated pressure while the lenses and temples are removed from the eyeglasses; and reassembling the eyeglasses.

2. Method as defined in claim 1, wherein said impression material is distributed over the bridge of the wearer's nose and the eyeglasses placed over it in the optimal position.

* * * * *